J. PEEPER.
SLIP JOINT PIPE LOCKING MEANS.
APPLICATION FILED OCT. 9, 1916.

1,226,002.

Patented May 15, 1917.

Inventor
Josiah Peeper

By
Herbert E. Smith
Attorney

UNITED STATES PATENT OFFICE.

JOSIAH PEEPER, OF COEUR D'ALENE, IDAHO.

SLIP-JOINT-PIPE-LOCKING MEANS.

1,226,002.  Specification of Letters Patent.  Patented May 15, 1917.

Application filed October 9, 1916. Serial No. 124,594.

*To all whom it may concern:*

Be it known that I, JOSIAH PEEPER, a citizen of the United States, residing at Coeur d'Alene, in the county of Kootenai and State of Idaho, have invented certain new and useful Improvements in Slip-Joint-Pipe-Locking Means, of which the following is a specification.

My invention relates to improvements in slip joint pipe locking means, and the object of my invention is the provision of a pipe locking or retaining device especially designed for use in connection with stove pipes and the like to lock or retain the same in telescopically joined relation.

A further object is the provision of a device of this character which is of extremely simple inexpensive construction, and thoroughly practical and efficient in actual use.

Generally speaking, my invention comprises, in combination with two telescopically joined pipe sections, a flat expansible and contractible spring metal band of suitable dimensions adapted to lock the pipe sections together, said band serving to accomplish this result in connection with a circumferential bead of one of the pipe sections, and a device for manually contracting and expanding the band.

The details of construction, combination and arrangement of the several elements of my organization, will be hereinafter pointed out and described in detail, recourse being had to the accompanying drawings, in which—

Figure 1:
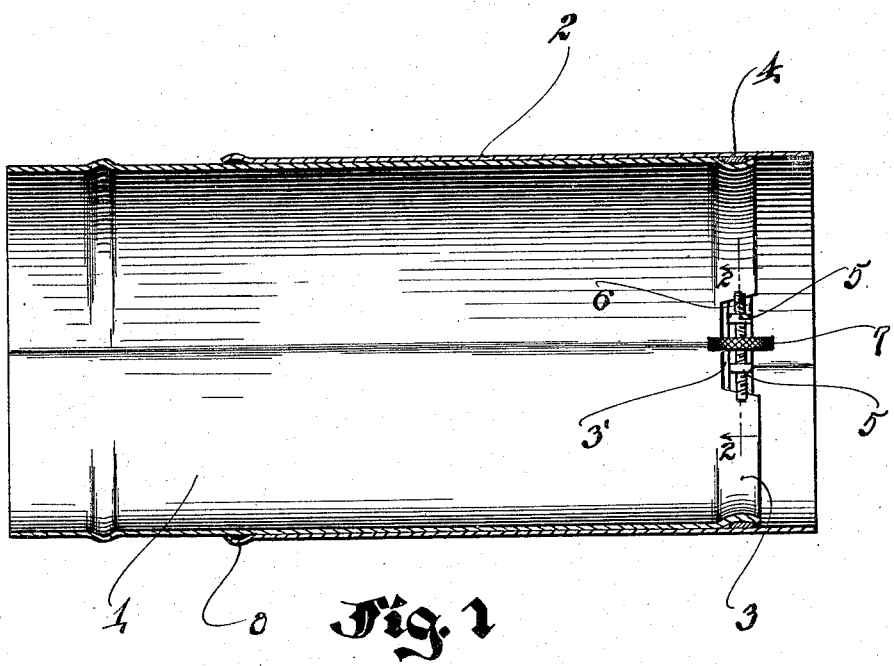
Figure 1 is a longitudinal sectional view of two pipe sections telescopically joined and secured together by means of my improved device.

Referring more specifically to the drawings in which like reference characters are used to indicate like parts in the several views, the numeral 1 designates a length or section of stove pipe telescoped within a length or section 2. Said section 1 has its inserted end provided with the contracted or inwardly directed circumferential bead 3 which is adapted to be encircled by the flat spring metal locking band 4.

The adjacent ends 5—5 of this band 4 are inturned at approximately right angles and spaced apart as shown, and provided with threaded apertures in which is mounted the right and left hand threaded expansion and contraction screw bar 6 having the milled or knurled head or wheel 7 disposed intermediate and centrally of its extremities. The bead 3 has a segmental cut-out portion 3' to allow space for the inturned ends 5—5 and movement thereof.

Figure 2:
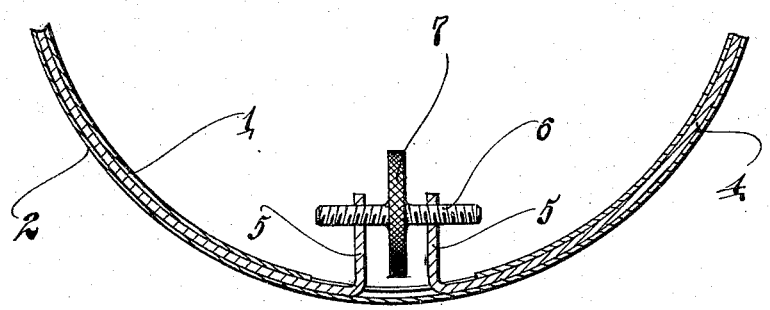
Fig. 2 is an enlarged transverse sectional view of the pipes and device taken on line 2—2 of Fig. 1.

By reference especially to Fig. 2, it will be apparent that rotation of the head 7 upwardly will serve to space the ends 5—5 farther apart and hence expand the band 4 so that the same will frictionally and firmly engage the inner surface of the pipe section 2, and thereby lock the pipe sections together and prevent sliding movement thereof. A reverse rotation of the head 7 will, of course, contract the locking band so that the pipe sections will be released from locked relation or engagement.

While I have shown the locking band mounted upon the bead of the interior pipe section 1, it is evident that the same may be employed in conjunction with the bead 8 of the outer pipe section 2 by providing the latter bead with a segmental cut-out portion such as previously referred to. In that event, the ends of the locking band would project outwardly and the band would be contracted to frictionally engage with the internal pipe 1.

While I have illustrated and described one form of my device, I wish it clearly understood that I expressly reserve the right to make any changes in construction, dimensions, and disposition of the parts, as will not depart from the principle and scope of my invention as set forth in the annexed claims.

Having described my invention, what I claim as new and desire to secure by Letters Patent of the United States, is:—

1. In a device of the character described, the combination of two telescopically joined pipe sections, a circumferential bead for one of said sections, a contractible and expansible spring band encircling said bead, and means for manually contracting and expanding the band.

2. In a device of the character described, the combination of two telescopically joined pipe sections, a circumferential bead for one of said sections, a contractible and expansible spring band encircling said bead, said band having turned or angular ends, and means carried by said ends for manually contracting and expanding said band.

3. In a device of the character described, the combination of two telescopically joined pipe sections, a circumferential bead for one of said sections, said bead having a cut-out portion, a contractible and expansible band encircling said bead and provided with turned or angular spaced end portions having threaded apertures, said end portions being mounted in said cut-out portion of the bead, and a right and left hand threaded screw-bar mounted in said threaded apertures for manually contracting and expanding said band.

In testimony whereof, I hereby affix my signature.

JOSIAH PEEPER.

Copies of this patent may be obtained for five cents each, by addressing the "Commissioner of Patents, Washington, D. C."